US005583873A

United States Patent [19]

Miyake et al.

[11] Patent Number: 5,583,873

[45] Date of Patent: Dec. 10, 1996

[54] MULTIPLEX BROADCASTING STATION SELECTION METHOD

[75] Inventors: Takashi Miyake; Shinichi Abe; Kazuhiro Kamiya; Mutsurou Tanque, all of Kawagoe, Japan

[73] Assignee: Pioneer Electronic Corporation, Tokyo, Japan

[21] Appl. No.: 423,948

[22] Filed: Apr. 19, 1995

[30] Foreign Application Priority Data

Apr. 27, 1994 [JP] Japan .................................. 6-089552

[51] Int. Cl.$^{6}$ .................................................. H04B 1/16

[52] U.S. Cl. .................. 370/527; 455/152.1; 455/154.1; 455/185.1

[58] Field of Search ..................... 370/110.4; 455/151.1, 455/152.1, 154.1, 154.2, 161.1, 161.2, 161.3, 185.1, 186.1, 186.2

[56] References Cited

U.S. PATENT DOCUMENTS 5,404,588 4/1995 Henze .............................. 455/152.1 X 5,428,825 6/1995 Tomohiro et al. ............... 455/152.1 X

*Primary Examiner*—Melvin Marcelo

*Attorney, Agent, or Firm*—Keck, Mahin & Cate

[57] ABSTRACT

A multiplex broadcasting station selecting method which can execute a station selecting operation in group units is provided. A PTY code to be compared and a channel are set to one set of large classification information. The user sequentially calls out the PTY codes to be designated to one group and depresses the same channel key or the like each time the desired PTY code is called, thereby storing into memory the large classification information in which a plurality of PTY codes are made correspond to a same channel number. When executing a retrieving operation, the user depresses one operation key. The large classification information corresponding to the channel number is consequently selected and the group having a similar genre can be retrieved as set. The user can receive either one of or all of the broadcasting stations in the large classification information of the group. A process such that the group is allocated to each of the channels which was conventionally impossible can be executed, so that the range of application of the RDS broadcasting is broadened.

4 Claims, 5 Drawing Sheets

MULTIPLEX BROADCASTING STATION SELECTION METHOD

BACKGROUND OF THE INVENTION

1. Field of the Invention

The present invention relates to a receiver for receiving what is called a radio data system (RDS) broadcasting and, more particularly, to a broadcasting station selecting method to select a station by using program type information (PTY code).

2. Description of Background Information

Such an RDS broadcasting relates to a multiplex broadcasting in which additional information highly valuable in a radio installed in a car or the like is superimposed to a voice signal. The additional information includes station selection information, traffic information, and the like which are necessary to specify a broadcasting station located in the area and is standardized as a format regarding the RDS broadcasting.

In addition to the voice signal, the data format of such an RDS broadcasting includes additional information such as program identification information (PI code), a group type code, a PTY code, and the like. Among them, the PTY code plays a role to identify a type of the program (music program, news program, sports program, or the like). A list of its allocation is shown in Table 1.

TABLE 1

| Code Number | PTY Code | Contents of program types |
|---|---|---|
| 1 | 00000 | No program |
| 2 | 00001 | News |
| 3 | 00010 | Current events |
| 4 | 00011 | Animated cartoon |
| 5 | 00100 | Sports |
| 6 | 00101 | Education |
| 7 | 00110 | Program for children |
| 8 | 00111 | Program for young adults |
| 9 | 01000 | Religious program |
| 10 | 01001 | Drama |
| 11 | 01010 | Rock music |
| 12 | 01011 | Light music |
| 13 | 01100 | Serious music |
| 14 | 01101 | Jazz |
| 15 | 01110 | Folk music |
| 16 | 01111 | Variety |
| 17–31 | | Undefined |
| 32 | 11111 | Emergency broadcasting |

An ordinary vehicle mounted radio receiver is designed by assuming that the handling thereof may be performed by a user who is driving in a car. In order to simplify the operation, therefore, operation keys in the form of push buttons are used (e.g., what are called 1–6 keys, specifying a broadcasting station by a six kinds of numbers are generally used). By previously storing specific broadcasting station information in correspondence to the operation key, afterwards the broadcasting station can be easily selected by depressing the operation key. The numbers assigned to the operation keys (hereinbelow, referred to as channel numbers) are made correspond to the broadcasting stations in a one-to-one relation.

Hitherto, a receiver for searching (retrieving and receiving) a broadcasting wave of desired broadcasting contents by a simple operation by using the PTY code has been developed (Japanese Patent Kokai No. 4-336809). In a station selecting process by the searching operation of such a receiver, the user at first instructs a program type by the operation key. The PTY code (hereinafter, referred to as a comparison PTY code) which is formed from the program type is compared with the PTY code of the additional information according to the RDS broadcasting that was selected and demodulated by a tuner. A control section of the receiver controls the tuner and receives the PTY code of the received broadcasting wave. In the event that the PTY code of the RDS broadcasting and the comparison PTY code are not identical, the control section retrieves a broadcasting station of another frequency. The above operation is continued until both of the PTY codes coincide.

There are 32 kinds of information regarding the program types as shown in Table 1. In order to designate the program types in correspondence to all of the PTY codes, consequently, 32 operation keys must be provided. Since an operation panel of the radio receiver installed in a car is not wide, however, a method is generally adopted in which presetting of only necessary PTY codes (for example, only six kinds) is performed by the respective operation keys. The receiver, therefore, has a memory regarding the PTY codes (hereinbelow, referred to as a PTY memory) and, ordinarily, a corresponding comparison PTY code is called by the channel number designated by the operation key, thereby performing the searching operation.

FIG. 1 shows a memory construction of the conventional PTY memory. As shown in FIG. 1, the PTY code representing a desired program type is stored in correspondence to the number of operation keys. The RDS receiver retrieves and receives the waves of the broadcasting station broadcasted by the desired program type by using the PTY memory.

As mentioned above, a receiver which doesn't have a memory like a PTY memory to make the channel numbers and the PTY codes correspond and selects a station by a memory to directly store the PTY codes and the frequency information and PS codes and the like of the receiving station according to the PTY codes has been disclosed in Japanese Patent Application Kokai No. 63-136828.

According to the construction of the above-mentioned conventional PTY memory, however, there is an inconvenience such that a plurality of PTY codes cannot be stored for each of the channel numbers.

It is now considered how the user using the PTY codes of the RDS broadcasting selects the broadcasting station depending on the program type.

First, there is a case of selecting the station of only a specific program type (for example, news, jazz, or the like). The conventional PTY memory managing method can cope with such a case. In case of considering the programs as groups classified by the genre, for example, desires in case of mainly collecting information, in case of listening to any music, in case of shaking off sleepiness by mainly listening to talking programs, and the like are naturally considered.

According to the construction of the conventional PTY memory, since there is the above inconvenience such that one channel number and one operation key are allocated to each PTY code, the user must specify and operate the operation key allocated to one of the genre. For example, even if the user wants to listen to any music, he once decides "jazz" by himself and operates the operation key of the corresponding channel number.

In general, however, since the user frequently selects the station by separating to a desired genre (for example, classification such as "music", "news relation") rather than he desires a specific program type it will be convenient if the station can be selected by using a group in which a plurality of PTY codes are collected as a unit.

According to the conventional PTY memory, the PTY codes are stored in correspondence to the channel numbers (FIG. 1).

OBJECTS AND THE SUMMARY OF THE INVENTION

In the case where a plurality of PTY codes are made corresponding to one channel number, when simply considering, it is conceivable that a plurality of portions to store the PTY code are provided for one channel number (FIG. 2). As will be also understood from FIG. 2, however, when considering a case where maximum 32 PTY codes are made correspond to one channel, a memory capacity of "32 PTY codes×(channel numbers+1)" is necessary. Such a memory capacity is too large to occupy a limited RAM space of a CPU or the like and it is a memory using method of a low efficiency. In case of reducing the number of PTY codes which can be stored in one channel, a degree of freedom of the PTY setting decreases.

It is, therefore, an object of the invention to provide a broadcasting station selecting method which can perform a station selecting operation by using a group in which a plurality of program types are collected as a unit. Another object of the invention is to provide a broadcasting station selecting method whereby the user can arbitrarily set the group.

According to the first aspect of the invention, in a multiplex broadcasting station selecting method whereby at least a multiplex broadcasting wave in which classification information of each broadcasting station is superimposed on a main signal is selected on the basis of previously set classification information for retrieval, the method is characterized in that the large classification information pieces each of which relates a designated access number to one or more designated pieces of the classification information for retrieval are formed, and when a retrieving operation is executed, an access number associated with a desired large classification is designated and the large classification information pieces corresponding to the access number are read out, so that one or two or more multiplex broadcasting waves associated with the desired large classification piece are selected by using one access number.

According to the second aspect of the invention, in the multiplex broadcasting station selecting method configured according to the first aspect of the invention, each of the large classification information pieces are operative to relate the designated classification information for retrieval to the access number in a one-to-one relation, and the large classification information pieces are provided in number corresponding to the number of kinds of different classification information for retrieval.

According to the first aspect of the invention, the PTY code (classification information for retrieval) and the channel number (access number) are used as one set of classification information. The user sequentially retrieves the PTY code to be designated to one group from a control section or the like. The user performs a depression of the same channel key or the like every time the desired PTY code is called out, thereby forming a plurality of large classification information in each of which a plurality of PTY codes are related to the same channel number.

When performing a retrieving operation, the user depresses an operation key, then the large classification information corresponding such a channel number is selected and the groups of a similar genre can be retrieved as they were set. In this way, the user can receive the multiplex broadcasting stations of either one or all of the large classification information of the group.

According to the second aspect of the invention, the PTY code among the large classification information is set so that the codes are not overlapped for each kind. In presetting the PTY code and the channel number, the channel number at that time is stored in correspondence to the designated PTY code, thereby forming one large classification information.

The formation of the large classification information having quite the same contents is avoided in this way, and therefore, there is no need to judge about the overlap and an efficient use of the memory is enabled.

DETAILED DESCRIPTION OF THE PREFERRED EMBODIMENTS

Preferred embodiments according to a broadcast receiving system of the present invention will now be described with reference to the drawings.

(i) First embodiment

According to the first embodiment of the invention, a memory to store selection information of the number corresponding to only the number of kinds of PTY codes and a plurality of comparison PTY codes are made correspond to one channel number, thereby enabling a station to be selected by a group.

Figure 3:
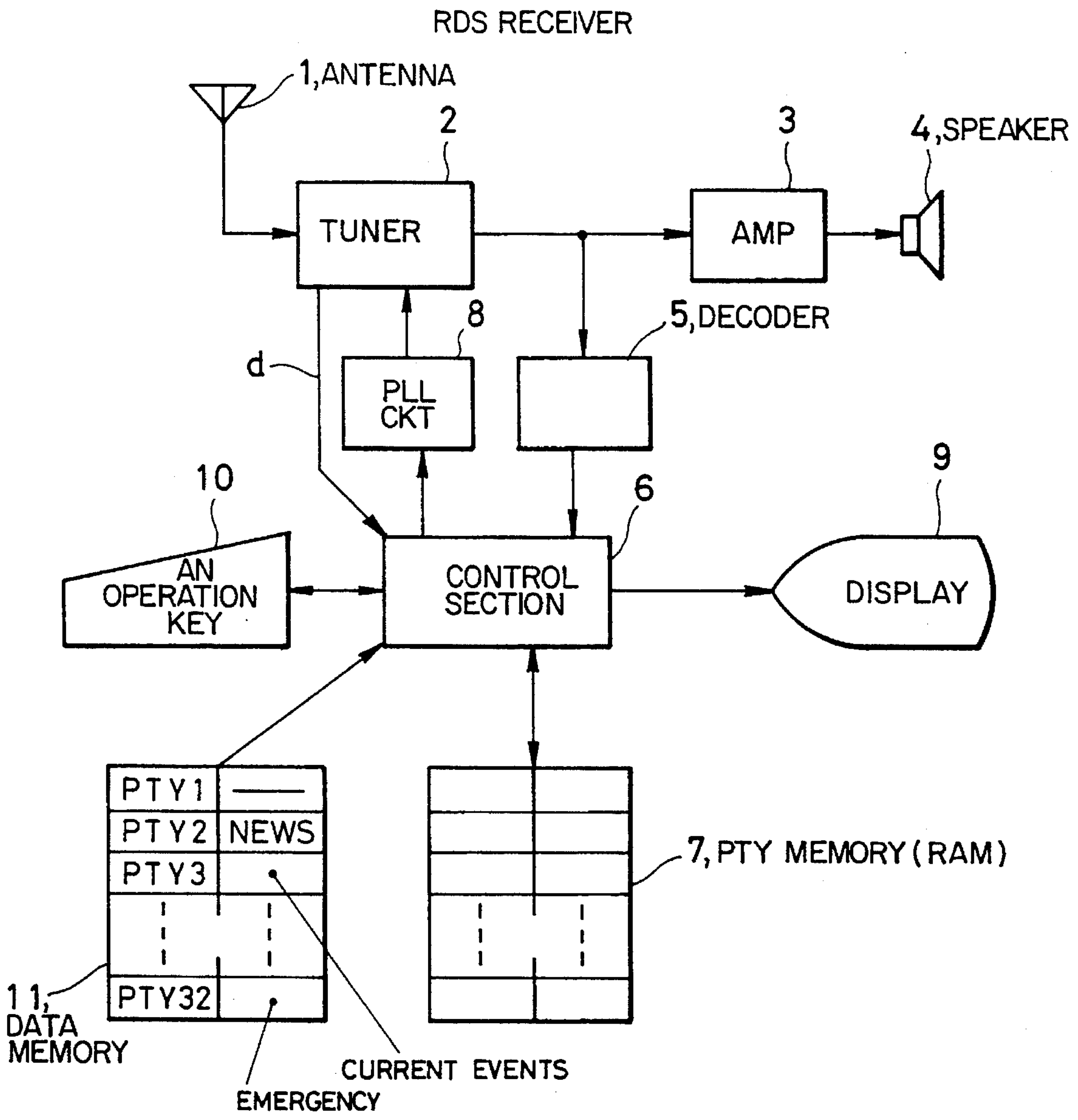
FIG. 3 shows a radio data system of an embodiment of the invention and is a block diagram showing a radio data system receiver of the embodiment.

FIG. 3 shows a construction of the first embodiment of the invention. As shown in FIG. 3, an RDS receiver of the embodiment comprises: an antenna 1 for receiving broadcasting waves; a tuner 2 for performing the first stage amplification and for outputting a detection signal; an amplifier 3 for selecting a voice signal from the detection output and for power amplifying; and a speaker 4 for converting the power amplified voice signal to acoustic waves. The RDS receiver demodulates the voice signal.

On the other hand, the PTY code is formed by a decoder 5 for decoding the PTY code from the detection output generated from the tuner 2. A control section 6 receives the decoded PTY code, judges by comparing whether the PTY code coincides with the code in a PTY memory 7, and controls a PLL circuit 8, an operation key 10, and a display 9. The PTY memory 7 stores selection information which is constructed by the comparison PTY code and channel information and is constructed by an RAM. The PLL circuit 8 sets a frequency to be received to the tuner 2. The display 9 displays frequency information, a program type, a channel number, and the like. The operation key 10 is a terminal device for designating the program type and channel by the user. A data memory 11 stores information of the program types each corresponding to the PTY code. The control section 6 refers to such a memory and displays the corresponding program type on the display 9. In this instance, the PTY memory 7 has a function to allocate the PTY codes stored in the data memory 11 and information regarding the PTY codes and the channel numbers.

Figure 4:
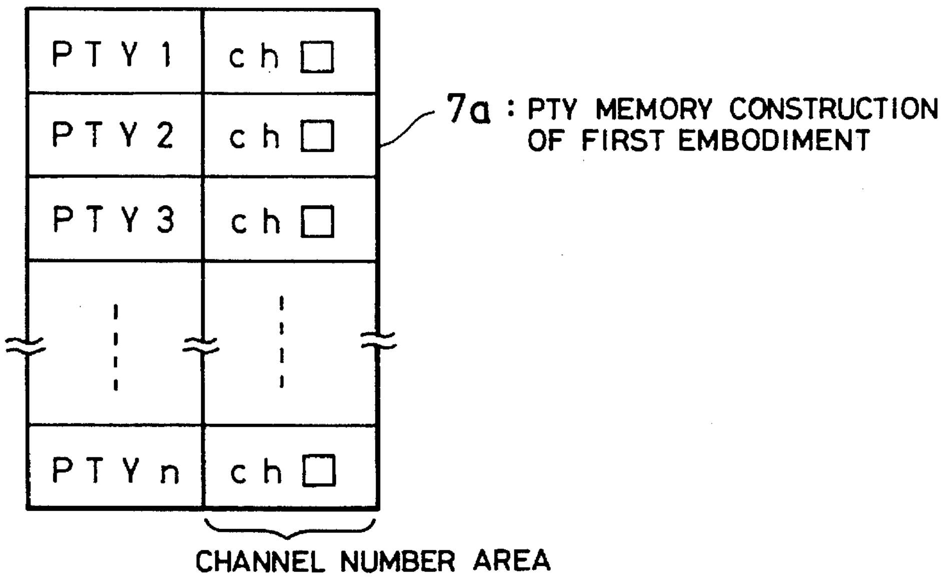
FIG. 4 shows the radio data system of the embodiment of the invention and particularly shows the construction of the PTY memory of the first embodiment.

FIG. 4 conceptually shows an internal construction (7*a*) of the PTY memory 7 in the first embodiment. As shown in FIG. 4, the PTY codes have previously been stored as comparison PTY codes in accordance with the order from a specific address (for example, a low address) of the PTY memory 7*a*. It is assumed that those PTY codes correspond to the numbers of the PTY as shown in Table 1. An area to store one channel number (hereinbelow, referred to as a channel number area) is provided for each comparison PTY code. The channel numbers corresponding to the numbers of buttons of the operation key 10 are stored in the channel number area. The same channel number can be set for the different comparison PTY codes.

The operation will now be described.

Figure 5:
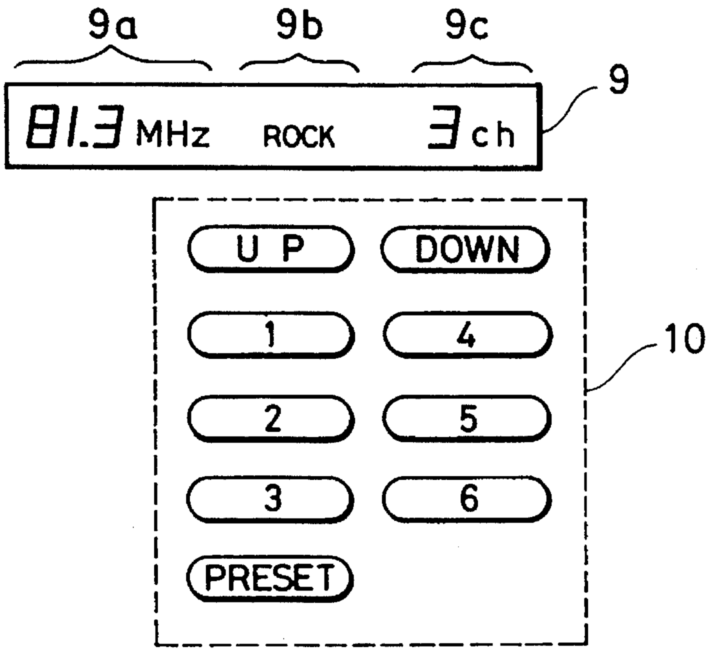
FIG. 5 is a diagram showing the construction of an operating section and a display of the embodiment.

FIG. 5 shows a display example of the display 9 and operation key 10 which can be used in the embodiment. In FIG. 5, a "preset" key is a key to designate an operating mode. When depressing the "preset" key, the mode is set to a preset mode. When again depressing the "preset" key, the preset mode is canceled and an ordinary reception is performed. Channel keys "1" to "6" are keys which are used for setting the channel number. Although the operation key 10 has a plurality of keys in the embodiment, it is also possible to provide only one key. In the preset mode, by depressing those keys, the PTY code corresponding to the program type displayed on the display at that time is stored into the PTY memory 7. In the ordinary operating mode, by depressing those keys, a searching operation regarding the channel number starts and the comparison PTY code corresponding to the channel number is called. "UP" and "DOWN" indicate keys for feeding and returning the program type display on the display 9 in the preset mode.

A column 9*a* to show a frequency of the broadcasting waves which are being received, a column 9*b* to display the program type, and a column 9*c* to display the channel number are provided for the display 9.

In performing the presetting operation

When using the receiver, it is necessary to previously set the channel numbers to the PTY memory 7*a*. The user, therefore, depresses the "preset" key. Consequently, the control section 6 operates in the preset mode.

The control section 6 first refers to the first PTY code in the data memory 11, reads out information regarding the corresponding program type, and displays it on the display. For instance, in the case where the PTY code is set to "2", the corresponding program type ("news") is displayed on the display 9*b*. In the case where the user desires a registration of the program type, he depresses the channel key of the channel to be stored. For example, in case of setting "news" to the channel "1", the user depresses the channel key of "1" in a state in which "news" is displayed on the display 9*b*. The channel number "1" is, consequently, stored in the channel number area corresponding to the PTY code "2" in the PTY memory 7*a*. In order to prevent an erroneous setting, it is sufficient to set the program so as to write the channel number into the PTY memory 7*a*, for example, only when the channel key is continuously depressed for two seconds or more.

In case of setting "variety" as a program concerning information similar to "news" to the same group (channel "1"), the user first continuously depresses the "UP" key. The program type information corresponding to the PTY code which is sequentially increased is read out from the data memory 11 and is sequentially displayed on the display 9*b*. When "variety" is displayed, the user again depresses the "1" key, thereby instructing to write into the PTY memory 7*a*. The channel number "1" is, consequently, stored in the channel number area corresponding to the PTY code "16".

"News" and "variety" are allocated to the group regarding the channel "1" by the above operations. With respect to the keys of other numerals, a group of a music program or a group of an education program can be also similarly set. In the embodiment, since the 1–6 key is used, total six groups can be set. It is also possible to provide groups of the number corresponding to only the number of keys which can be installed.

The above setting of the groups can be also performed at the time of shipping from a factory. For example, programs of a specific tendency such as music relation, information relation, programs of mainly talking, and education programs are collected as a group and are set to "1" to "4" keys, respectively, and are preset in the factory, and the remaining channels are set as user options.

In performing the searching operation

Figure 6:
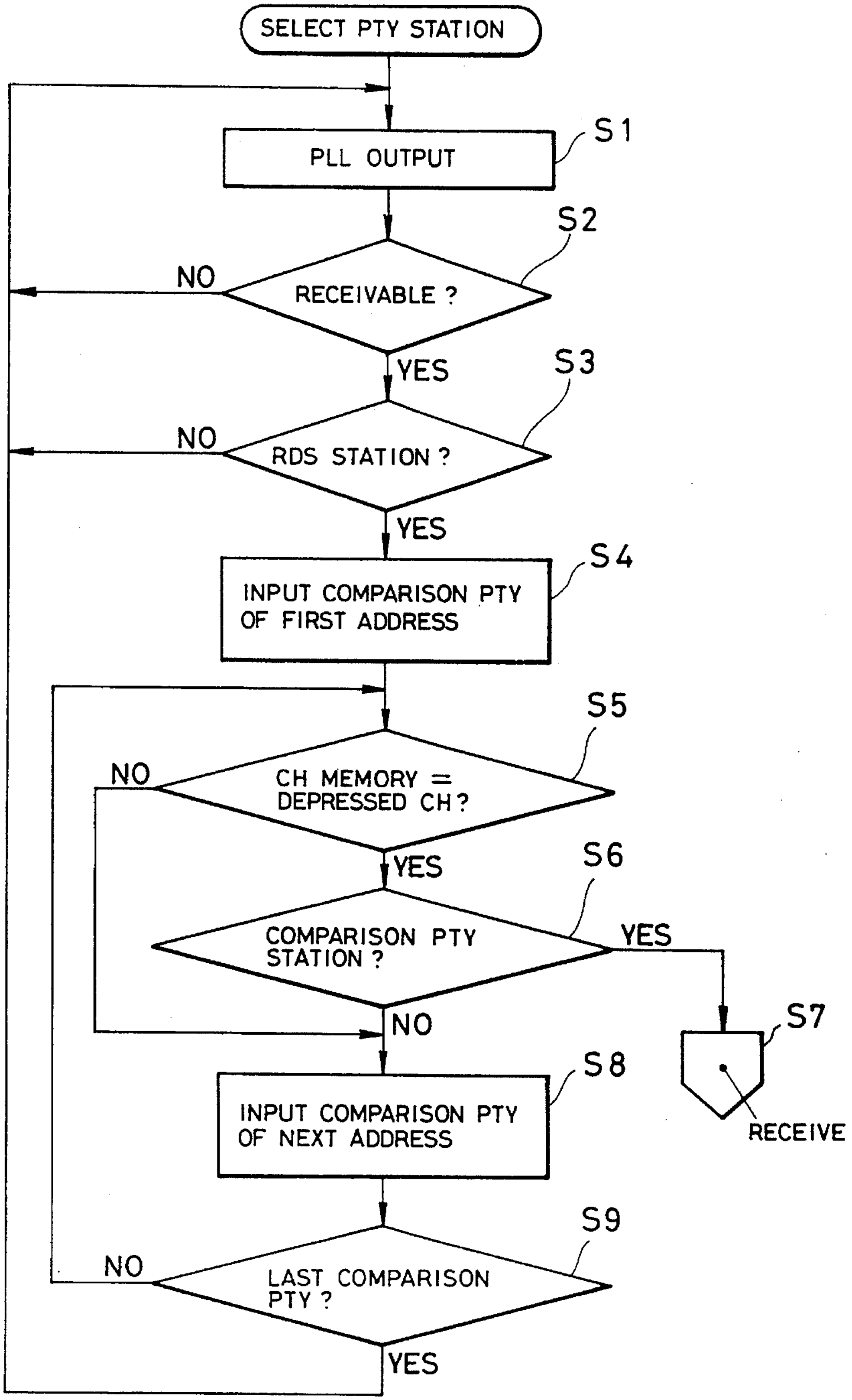
FIG. 6 is a flowchart for explaining the operation of the embodiment.

The searching operation will now be described with reference to a flowchart of FIG. 6.

The user cancels the preset mode by depressing again the "preset" key of the operation key 10 or the like, so that the mode enters an ordinary receiving standby mode.

A receiving operation in the case where "news" of the PTY code "2" and "variety" of the PTY code "16" are allocated to the group of the channel "1" by presetting will now be explained hereinbelow as an example.

When the user depresses any one of channel keys, the searching operation of the channel number corresponding to the number of such a channel key starts. In this instance, it is assumed that the channel key "1" was depressed by the user.

The control section 6 sets the first frequency (for example, 76.0 MHz in case of FM broadcasting or the like) of a reception band to the PLL circuit 8 (step S1). The tuner 2 is tuned to the frequency and outputs a judgment signal d indicating whether there are receivable broadcasting waves or not.

In the case where the judgment signal d is valid (in the case where the broadcasting waves exist; step S2: YES), the control section 6 checks whether the broadcasting waves which are being received are the RDS broadcasting or not by checking a synchronizing situation of digital data of the decoder 5 (step S3). In the case where the judgment signal d is not valid (in the case where no broadcasting wave exists; step S2: NO), the control section 6 seeks up or down to a next frequency, thereby allowing the PLL circuit tune and the check of the receiving state is repeated again (step S1).

In the case where no digital data is included in the broadcasting waves that are being received or the like, since the data is not synchronized, it is judged that the broadcasting waves are not the RDS broadcasting waves. In the case where the broadcasting is not the RDS broadcasting (step S3: NO), the control section 6 seeks another frequency (step S1).

In the case where the digital data regarding the broadcasting waves during the reception is synchronized and it can be judged that the received waves are the waves of the RDS broadcasting (step S3: YES), the control section 6 executes the comparison of the PTY codes (step S4).

The control section 6 sequentially reads out the PTY codes in accordance with the order of addresses in the PTY memory 7*a* as comparison PTY codes to be checked (step S4). The PTY codes can be also sequentially read out from an upper address or from a lower address. In this instance, it is assumed that the PTY codes have been stored in accordance with the order of the code numbers from the highest data address.

The control section 6 subsequently reads out the channel numbers stored in the channel number area corresponding to the first read-out PTY code "1" (shown as "PTY1" in the diagram) and checks whether the readout channel number is equal to the channel number designated by the user or not (step S5). In this case, since the channel number area in which the channel number "1" has been stored is set so as to correspond to the PTY codes "2" and "16", the comparison result denotes that the channel numbers don't coincide. The processing routine advances to a process of NO in step S5.

The control section 6 reads out the comparison PTY code ("2") from the address (in this instance, the data address that is one-address lower) in which the comparison PTY code to be checked has been stored (step S8). A check is made to see if the number of read-out PTY code has reached the number of the last PTY code or not (step S9).

In this instance, since the PTY codes to be checked still remain (step S9: NO), the comparison between the channel number designated by the user and the comparison PTY code is executed again (step S5). Since the comparison PTY code has been increased to "2" at this time, the channel number "1" stored in the channel number area corresponding to such a PTY code coincides with the channel number "1" designated by the user (step S5: YES).

By the above-mentioned retrieval, the PTY code "2" for the channel number "1" designated by the user can be found out.

In step S6, the control section 6 reads out the PTY code of the received RDS broadcasting waves from the decoder 5 and a check is made to see whether the retrieved comparison PTY code coincides with the PTY code of the RDS broadcasting during the reception or not (step S6).

In the case where both of the PTY codes coincide (step S6: YES), since the RDS broadcasting during the reception has the program type ("news") of the desired group, the processing mode advances the receiving operation at the frequency as it is (step S7).

In the case where both of PTY codes don't coincide (step S6: NO), the program type of the RDS broadcasting during the reception is not the program type regarding the detected comparison PTY code (namely, it is not the RDS broadcasting station to broadcast the "news" program). At that time, in order to retrieve whether another comparison PTY code has been set to the same channel number or not (a check is made to see if there is another program type set in the same group), the comparison PTY code stored in the next address is read out (step S8).

By repeating the above procedure, another comparison PTY code "16" which coincides with the channel number designated by the user can be detected again. In step S6, when the comparison PTY code doesn't coincide with the PTY code of the RDS broadcasting during the reception, the program type of the received RDS broadcasting doesn't correspond to the program type in the group set in the channel number "1".

Finally, therefore, the PTY code reaches the final comparison PTY code in step S9 (step S9: YES), the receiver executes a reception of another broadcasting station of a new frequency (step S1). For example, the reception frequency is shifted from 76.0 MHz to 76.1 MHz. The above procedure is repeated again. That is, a check of the receiving state (step S2) and a check about whether it is the RDS broadcasting station or not (step S3) are made and a check is made to see whether the RDS broadcasting waves having the PTY codes "2" and "16" allocated to the channel number "1" can be received or not (steps S4 to S9).

According to the above procedure, the user sequentially checks the groups which have previously been designated and the station selecting operation of the RDS broadcasting having the corresponding program type can be performed.

According to the above operations, since a case where the desired broadcasting station cannot be finally found out can be also considered, it is also possible that the control section 6 finishes the searching operation at the stage where all of receivable frequency bands were scanned and such a fact is displayed on the display 9.

According to the first embodiment, the station selecting operation by the set PTY groups can be performed. In addition, by using the memory construction of the PTY memory 7*a* in FIG. 4, there is no trouble such that the same PTY code is recorded to a plurality of channel numbers in an overlapping manner. It is also possible to allocate, for example, 32 kinds of PTY codes to one channel or to allocate one program type to one channel, so that the allocation of the program types can be freely performed and a merit of the RDS broadcasting can be used.

(ii) Second embodiment

According to the second embodiment of the invention, the construction of the PTY memory is provided so as to be different from that of the first embodiment.

Figure 7:
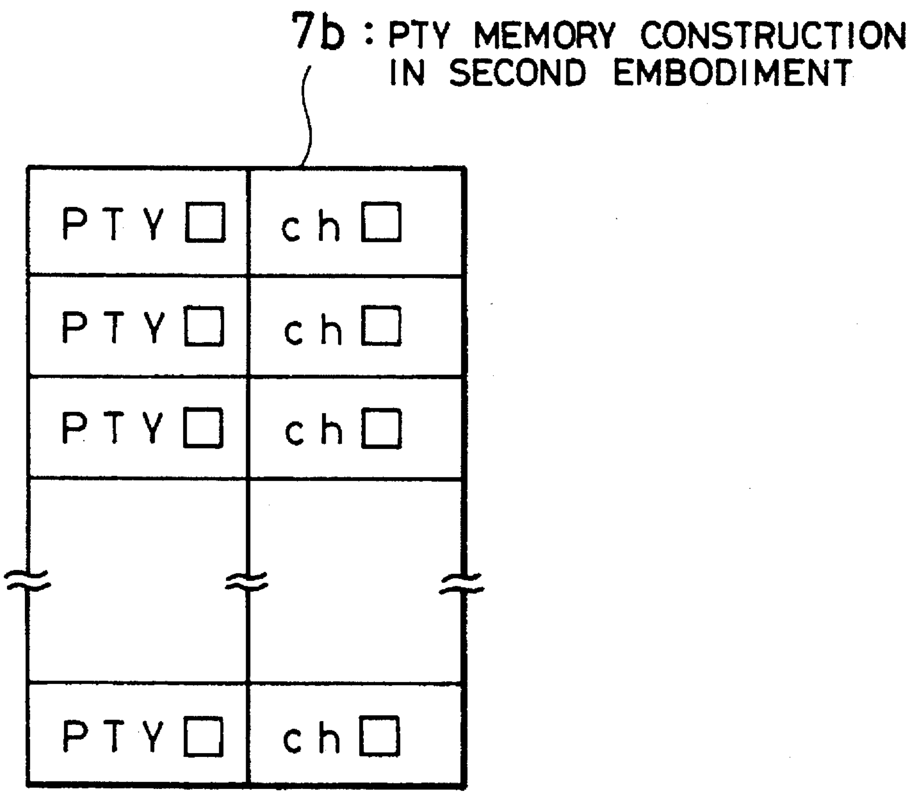
FIG. 7 is a diagram showing the construction a PTY memory of the second embodiment.

In the construction of the second embodiment, a memory having a construction of 7*b* shown in FIG. 7 is used as a PTY memory 7. Since the other construction of the second embodiment excluding the memory construction is the same as that of the first embodiment (FIG. 3), its explanation is omitted.

FIG. 7 shows a memory construction of the PTY memory 7*b* which is used in the second embodiment. As shown in FIG. 7, one pair of the comparison PTY code and channel number data is set to one set of selection information and a plurality of selection information are provided in the PTY memory 7*b* in the embodiment. The number of selection information is not limited by the program type, for example, to 32 like the first embodiment, but can be set to a number smaller than 32.

The operation will now be described.

In the presetting operation

Since an absolute address corresponding to the PTY code is not decided in the PTY memory 7*b*, the presetting operation for the PTY memory 7*b* is separately performed by referring to the PTY codes. The PTY codes stored in the data memory 11 are used as PTY codes to be referred.

In the presetting mode, the program type information corresponding to the PTY code is read out from the data memory 11 and is displayed on the display 9*b*. when the user designates a specific channel number by the channel keys of the operation key 10, the PTY code of the program type displayed on the display 9*b* at that time is called out from the code memory and the PTY code is stored in the PTY memory 7b in a form corresponding to the designated channel number in a one-to-one relation. In such a storing operation, the PTY codes are sequentially stored in accordance with the order set by the presetting operation.

For instance, in the case where "rock music" is displayed on the display 9b, by depressing the channel number "2", a pair of the PTY code "11" and the channel number "2" are stored into the first address (highest address or lowest address) in the PTY memory 7b. In the case where "jazz music" is displayed on the display 9b, by again depressing the channel number "2", a form such that the PTY code "14" corresponds to the group of the same channel number "2" is stored in the next data address in the PTY memory 7b and the group is the same as that of "rock music".

As mentioned above, according to the capacity of the PTY memory 7b, an arbitrary number of pairs of the PTY codes and the memories to designate the channel numbers can be set.

In the searching operation

In the searching operation of the second embodiment, the searching operation is executed by a procedure (FIG. 6) similar to that in the first embodiment. Since the construction of the PTY memory 7 differs from that of the first embodiment, the comparison PTY codes to be called out are not arranged in accordance with the code order but are arranged in accordance with the storing order at the time of the presetting operation.

In the following description, it is assumed that a PTY code "11" ("rock music") and a PTY code "14" ("jazz music") have been set in the channel number "2" as a preset state.

When the user depresses the channel key "2" of the operation key 10, the control section 6 receives the signals from the first frequency in the reception band (step S1). Subsequently, whether there are the reception radio waves or not (step S2) and whether the broadcasting is the RDS broadcasting or not (step S3) are judged by procedures similar to those in the first embodiment.

In step S4, the comparison PTY code set in the first data address (either one of the highest address and the lowest address) in the PTY memory 7b is read out. In step S5, the channel number which has been preset by the presetting operation is read out from the channel number area corresponding to the read-out PTY code and is compared with the channel number designated by the user.

The subsequent operations regarding steps S5 to S9 are executed by a procedure similar to that of the first embodiment.

By the above operation, the memory pair of the comparison PTY code "11" and the channel number "2" is retrieved from the PTY memory 7b and the memory pair of the comparison PTY code "14" and the channel number "2" is also retrieved. When the RDS broadcasting radio waves during the reception which were compared in step S6 has either one of the above PTY codes, either one of the desired programs "rock music" and "jazz music" of the user can be received.

In the embodiment, since the selection information can be arbitrarily rewritten, a situation such that a plurality of same contents are stored occurs. To prevent it, the control section 6 can always check whether the comparison PTY codes have already been stored in correspondence to the other channel numbers or not. To execute such an operation, an operation to prevent the overlapped reading operations is necessary in the embodiment. For example, there is used a procedure such that at the time of the presetting operation, before new preset data is written into the PTY memory 7b, the memory is scanned and in the case where the contents are the same as the contents of the memory pair which have been stored before, they are not stored or the like. The overlapped data, consequently, can be eliminated.

According to the above second embodiment, the number of selection information to be set into the PTY memory is not limited by the number of kinds of PTY codes. Since the PTY codes are sequentially allocated in accordance with the order from the most significant one, even when an amount of contents in the PTY memory is small, the searching operation can be performed.

Other modifications

The present invention is not limited to the foregoing embodiments but many variations and modifications are possible.

For example, although the above embodiment has been explained with respect to the receiver on the assumption of the RDS broadcasting, the invention can be also applied to other broadcasting so long as it uses the program type as additional information.

The construction of the PTY memory is not limited to the constructions of FIGS. 4 and 7 but the PTY codes and channel numbers may be also stored in discontinuous memory addresses so long as there is a correspondence relation between them.

Although the PTY memory of the first embodiment has been constructed in a manner such that the PTY codes are previously stored and the channel numbers are stored in correspondence thereto, the storage of the PTY codes can be omitted so long as the numbers and order of PTY codes have been predetermined. Namely, by providing an area to store the data from a specific address, the address value indirectly indicates the PTY code. A simple address arithmetic operation, therefore, can be used in place of the reading operation of the PTY code.

According to the first aspect of the invention as mentioned above, a process of allocating the groups to each of the channels which was conventionally not possible can be executed. A range in application of the multiplex broadcasting to which the additional information is superimposed is thus widened. It is also possible to divide the data into groups in accordance with a taste of the user himself.

According to the second aspect of the invention, the memory construction is simplified and the corresponding control procedure is also simplified. The same classification information is not allocated to a plurality of access numbers. Since the small area of the memory, further, can be efficiently used, a spare memory area which may seldom be used as in the conventional apparatus becomes unnecessary.

What is claimed is:

1. A multiplex broadcasting station selecting method of selecting at least a receiving radio wave from multiplex broadcasting radio waves in which classification information of each broadcasting station is superimposed to a main signal, based on previously set classification information for retrieval, comprising the steps of:

forming classification information pieces into a plurality of groups, each of the groups being designated by an access number and created by a user, wherein at least one of the classification information pieces is allocated into each of said plurality of groups arbitrarily by the user;

retrieving at least one of the classification information pieces in a group by designating the access number corresponding to the group; and selecting one or more multiplex broadcasting radio waves associated with the classification information.

2. A method according to claim 1, wherein each of said plurality of groups are operative to relate said at least one of said classification information pieces for retrieval to said access number, and said access number is assigned to each of said classification information pieces arbitrarily.

3. A method according to claim 2, wherein said at least one of said classification information pieces are retrieved from a memory and access numbers corresponding to said classification information pieces are stored in another memory according to an order of said information pieces of said previously set classification information for retrieval.

4. A method according to claim 2, wherein said at least one of said classification information pieces are retrieved from a memory and said access numbers corresponding to said classification information pieces are stored in another memory in an order determined in a preset operation.

* * * * *

UNITED STATES PATENT AND TRADEMARK OFFICE

CERTIFICATE OF CORRECTION

PATENT NO. : 5,583,873

DATED : DECEMBER 10, 1996

INVENTOR(S) : TAKASHI MIYAKE ET AL

It is certified that error appears in the above-indentified patent and that said Letters Patent is hereby corrected as shown below:

On the title page item [75],

CORRECT THE SPELLING OF THE FOURTH INVENTOR'S NAME TO

-- MUTSUROU TANOUE --

Signed and Sealed this

Twenty-ninth Day of April, 1997

Attest:

BRUCE LEHMAN

*Attesting Officer* *Commissioner of Patents and Trademarks*

UNITED STATES PATENT AND TRADEMARK OFFICE
CERTIFICATE OF CORRECTION

PATENT NO. : 5,583,873

DATED : December 10, 1996

INVENTOR(S) : Takashi Miyake, Shinichi Abe, Kazuhiro Kamiya and Mutsurou Tanoue

It is certified that error appears in the above-identified patent and that said Letters Patent is hereby corrected as shown below:

IN THE DRAWINGS

Figure 1:
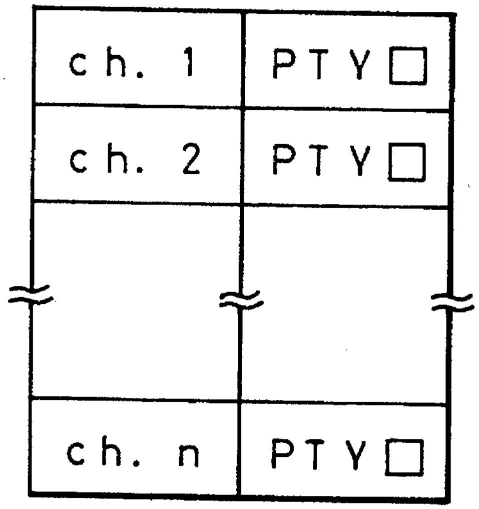
FIG.1 PRIOR ART
FIG. 1 is a diagram for explaining a conventional memory construction.
Figure 2:
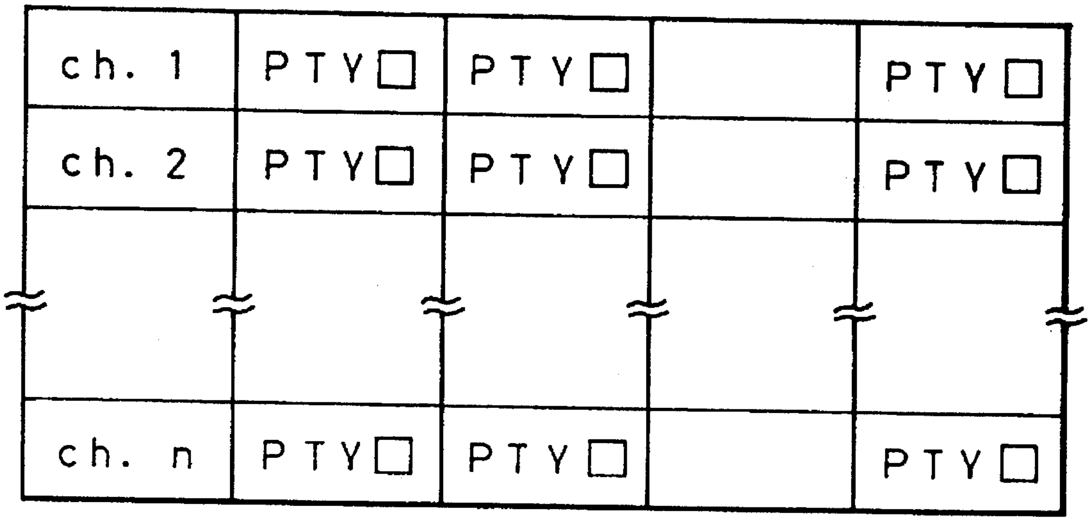
FIG.2 PRIOR ART
FIG. 2 is a diagram for explaining the conventional memory construction of FIG. 1 and showing a modification of the conventional memory construction of FIG. 1.

In Fig. 2, delete "Prior art".

Signed and Sealed this

Third Day of June, 1997

*Attest:*

BRUCE LEHMAN

*Attesting Officer*

*Commissioner of Patents and Trademarks*